United States Patent
Huang

(10) Patent No.: US 9,420,546 B2
(45) Date of Patent: Aug. 16, 2016

(54) CONTROLLING PEAK-TO-AVERAGE POWER RATIO (PAPR) BASED ON ADAPTIVE MODULATION AND CODING (AMC)

(71) Applicant: Empire Technology Development LLC, Wilmington, DE (US)

(72) Inventor: Anpeng Huang, Beijing (CN)

(73) Assignee: Empire Technology Development LLC, Wilmington, DE (US)

(*) Notice: Subject to any disclaimer, the term of this patent is extended or adjusted under 35 U.S.C. 154(b) by 61 days.

(21) Appl. No.: 14/239,635

(22) PCT Filed: Feb. 28, 2013

(86) PCT No.: PCT/CN2013/072015
§ 371 (c)(1),
(2) Date: Feb. 19, 2014

(87) PCT Pub. No.: WO2014/131184
PCT Pub. Date: Sep. 4, 2014

(65) Prior Publication Data
US 2015/0072718 A1    Mar. 12, 2015

(51) Int. Cl.
| H04W 52/26 | (2009.01) |
| H04W 52/24 | (2009.01) |
| H04W 52/36 | (2009.01) |
| H04W 52/18 | (2009.01) |
| H04L 27/26 | (2006.01) |

(52) U.S. Cl.
CPC ......... *H04W 52/241* (2013.01); *H04L 27/2614* (2013.01); *H04W 52/18* (2013.01); *H04W 52/262* (2013.01); *H04W 52/367* (2013.01)

(58) Field of Classification Search
None
See application file for complete search history.

(56) References Cited

U.S. PATENT DOCUMENTS

| 8,031,686 | B2 * | 10/2011 | Li et al. ..................... 455/522 X |
| 8,140,105 | B2 * | 3/2012 | Bjorken et al. ............... 455/522 |
| 2003/0096635 | A1 * | 5/2003 | Uehara et al. ............. 455/522 X |
| 2008/0170541 | A1 * | 7/2008 | Vartiainen et al. ............ 370/328 |
| 2009/0069026 | A1 | 3/2009 | Cho et al. |
| 2010/0034114 | A1 * | 2/2010 | Kim et al. ..................... 370/252 |
| 2010/0188984 | A1 | 7/2010 | Futagi et al. |

FOREIGN PATENT DOCUMENTS

| CN | 101141157 A | 3/2008 |
| CN | 102594503 A | 7/2012 |

OTHER PUBLICATIONS

International Search Report with Written Opinion for International Application No. PCT/CN2013/072015 mailed on Dec. 5, 2013.

* cited by examiner

*Primary Examiner* — Philip Sobutka
(74) *Attorney, Agent, or Firm* — Brundidge & Stanger, P.C.

(57) ABSTRACT

In an example embodiment, a transmitter of a wireless communication device may incrementally increase a level of transmit power by a predefined amount, based on a channel quality indicator, up to a limited maximum level of transmit power to control the peak transmit power and further may control the Peak-to-Average Power Ratio (PAPR).

20 Claims, 5 Drawing Sheets

CONTROLLING PEAK-TO-AVERAGE POWER RATIO (PAPR) BASED ON ADAPTIVE MODULATION AND CODING (AMC)

CROSS-REFERENCE TO RELATED APPLICATION

This application is the U.S. National Stage filing under 35 U.S.C §371 of PCT/CN2013/072015 filed on Feb. 28, 2013.

TECHNICAL FIELD

The embodiments described herein pertain generally to reducing mutual interference between sub-channels.

BACKGROUND

In a wireless mobile communication system, high Peak-to-Average Power Ratio may require a wide linear dynamic range of an amplifier and a digital-to-analog converter (D/A) or an analog-to-digital converter (A/D). It may further destroy the orthogonality between the sub-channels and cause serious interferences.

SUMMARY

In one example embodiment, a method may include dynamically implementing modulation and coding schemes (MCS) and corresponding levels of a transmit power, based on changes in a condition of a wireless communication channel, that are suitable for the condition of the wireless communication channel at a given time, and increasing a level of the transmit power incrementally by a predefined amount when no MCS is suitable for the condition of the wireless communication channel as the condition deteriorates.

In another example embodiment, a method may include receiving information representative of a first channel quality indicator (CQI) regarding a condition of a wireless communication channel, implementing a first modulation and coding scheme (MCS) corresponding to the first CQI, selecting a first level of a transmit power based on the first MCS, receiving information representative of a second CQI indicating deterioration of the condition of the wireless communication channel, implementing a second MCS corresponding to the second CQI in response to the second MCS being suitable for the second CQI, and increasing a level of the transmit power incrementally by a predefined amount in response to no MCS being suitable for the second CQI.

In yet another example embodiment, a computer-readable medium storing instructions that, when executed, may cause one or more processors to perform operations including receiving information representative of a condition of a wireless communication channel, implementing a modulation and coding scheme (MCS) and correspondingly a level of a transmit power when the adopted MCS is suitable for the condition of the wireless communication channel, and increasing a level of the transmit power incrementally by a predefined amount when no MCS is suitable for the condition of the wireless communication channel as the condition deteriorates.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
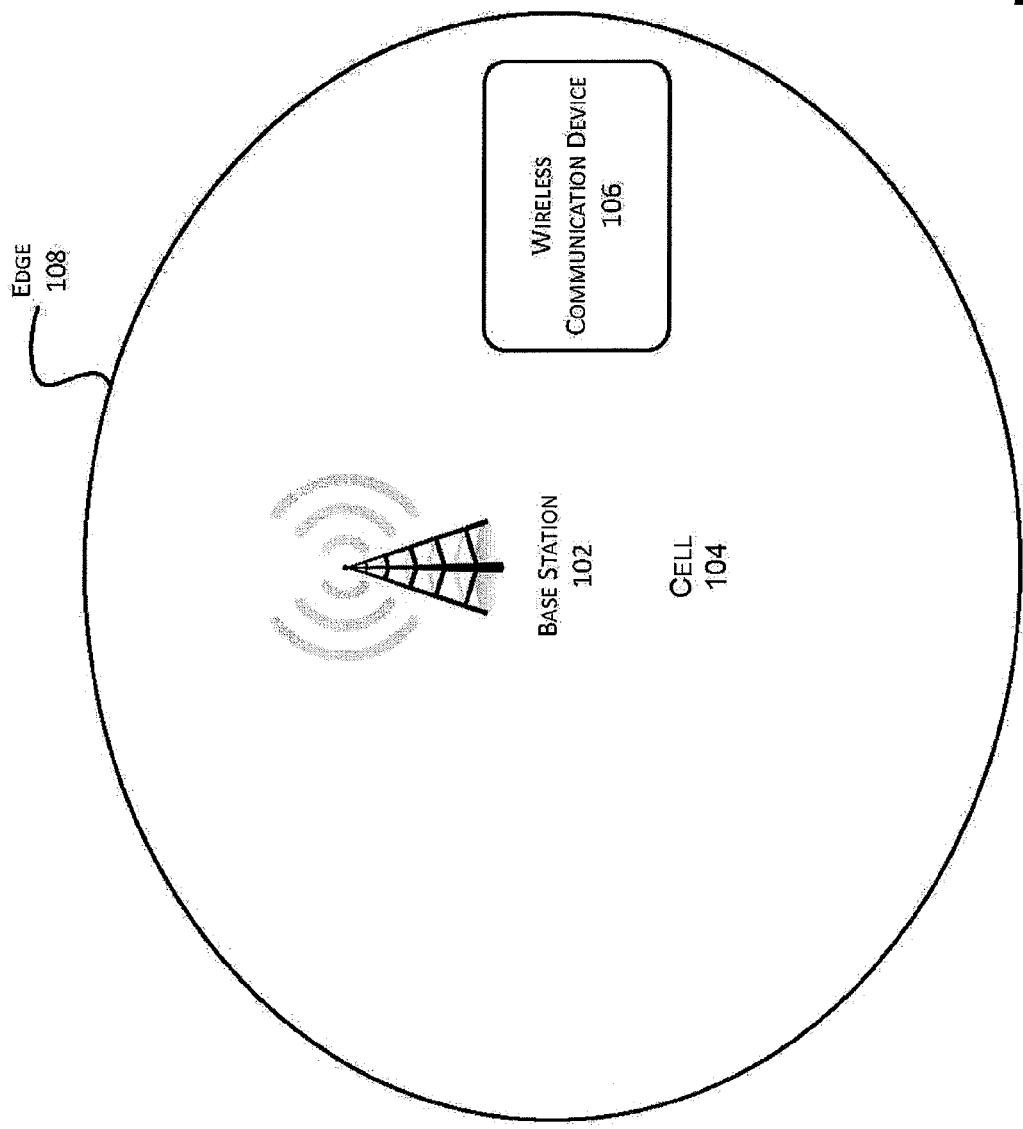
FIG. 1 shows an example system configuration of a wireless communication system by which controlling PAPR may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration 100 of a wireless communication system in which controlling Peak-to-Average Power Ratio (PAPR) may be implemented, arranged in accordance with at least some embodiments described herein. As depicted, system configuration 100 includes, at least, a cell 104 bounded by edge 108, a base station 102, and a wireless communication device 106. Base station 102 may be installed at a fixed location within the boundaries of cell 104, and may transmit wireless signals to and from wireless communication device 106 when wireless communication device 106 is located within the boundary defined by edge 108.

Cell 104 may refer to a range of radio coverage in a respective cellular network. Example embodiments of controlling PAPR may include one or more other cells similar to cell 104 to provide a wider coverage for wireless communications. Cell 104 may be configured to provide wireless communication infrastructure capabilities for wireless communication devices therein, via base station 102.

Base station 102 may be configured to support electronic communication between one or more wireless communication devices, e.g., wireless communication device 106, located within a corresponding cell, e.g., cell 104. Such communication may be in accordance with example wireless communication standards including Time Division Duplexing Long Term Evolution (TDD-LTE), Frequency Division Duplexing (FDD-LTE), IEEE 802.15.4, Global System for Mobile Communications (GSM), Code Division Multiple Access (CDMA), etc., which may further determine a work mode of the respective wireless communication devices. Work modes of wireless communication devices may include time division duplexing mode and frequency division duplexing mode. Such examples are not intended to be limiting, and therefore should not be interpreted to be so.

Edge 108 may refer to an outer boundary of a working range of cell 104. Wireless communication devices, e.g., wireless communication device 106, within the working range of base station 102 may reliably communicate with the base station, e.g., base station 102 in the respective cell. However, the working range defined, at least in part, by edge 108, may not be fixed, depending on a number of factors including, but not limited to, surrounding terrain, the frequency of signals in use, and the required data rate of the respective wireless communication devices. That is, edge 108 may extend radially from base station 102 in a manner that may or may not be equidistant in all directions.

Wireless communication device 106 may refer to a mobile (or portable) electronic device such as a mobile phone, smartphone, personal data assistant (PDA) a personal media player device, an application specific device, or a hybrid device that includes any of the above functions. Alternatively, wireless communication device 106 may be implemented as a personal computer including tablet, laptop computer, non-laptop computer configure configurations, etc. As depicted in FIG. 1, wireless communication device 106 may be located in a working range of cell 104 and may be configured to transmit signals to, and receive signals from, base station 102.

Thus, FIG. 1 shows an example system configuration 100 of a wireless communication system in which controlling PAPR may be implemented.

Figure 2:
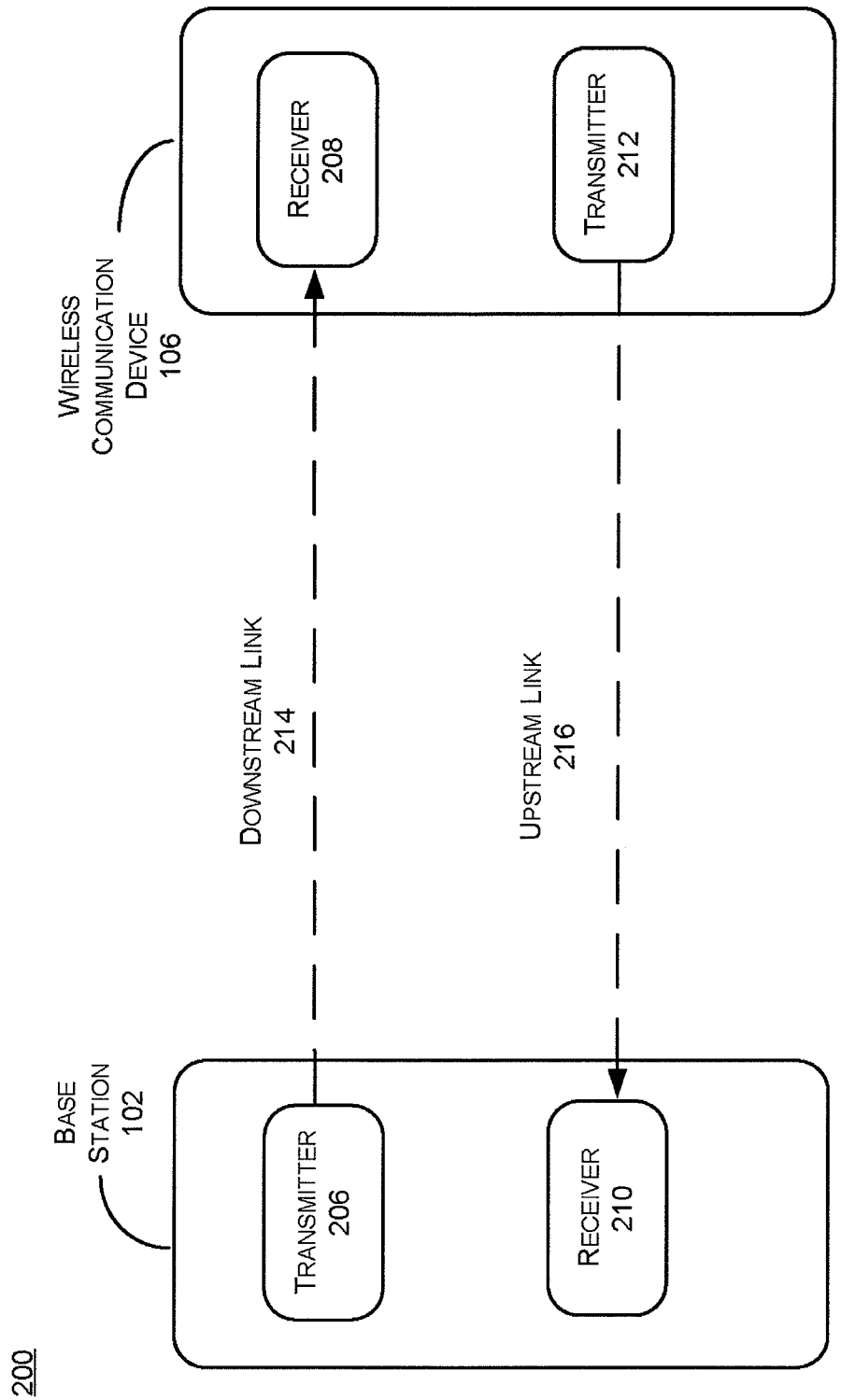
FIG. 2 shows an example configuration of a transmission mode by which at least portions of controlling PAPR may be implemented, arranged in accordance with at least some embodiments described herein.

FIG. 2 shows an example configuration 200 of a transmission mode by which at least portions of controlling PAPR may be implemented, arranged in accordance with at least some embodiments described herein. As depicted, example configuration 200 includes, at least, base station 102 including a transmitter 206 and a receiver 210; and wireless communication device 106 including a transmitter 212 and a receiver 208. Configuration 200 further depicts downstream link 214 of wireless communication device 106 established between receiver 208 and transmitter 206 and upstream link 216 of wireless communication device 106 established between receiver 210 and transmitter 212.

Transmitter 206 may be configured to establish downstream link 214 with receiver 208 of wireless communication device 106. Thus, transmitter 206 may be further configured to continuously transmit signals on downstream link 214. Downstream link 214 may be regarded as being "downstream" because the transmission of signals through the link is away from base station 102.

Transmitter 212 may be configured to establish upstream link 216 with receiver 210 of base station 102. Thus, transmitter 212 may be further configured to continuously transmit signals on upstream link 216. Upstream link 216 may be regarded as being "upstream" because the transmission of signals through the link is towards base station 102.

Downstream link 214 and upstream link 216 each may be allocated with a section of a frequency band utilized by one of the aforementioned examples wireless communication standards. For example, in a GSM supported cellular network, downstream link 214 may be allocated with a frequency band from 935 MHz to 960 MHz and upstream link 216 may be allocated with another frequency band from 890 MHz to 915 MHz.

In an example embodiment, by which the wireless communication system implements the LTE standard, downstream link 214 may be configured to implement orthogonal frequency-division multiplexing (OFDM), which may allow each of one or more wireless communication devices, e.g., wireless communication device 106, to utilize a section of the allocated frequency band to utilize the allocated frequency band.

To reduce Peak-to-Average Power Ratio (PAPR), wireless communication device 106 may be configured to control a peak value of the transmitting power of transmitter 212 since the average transmitting power of a given wireless communication system, i.e., base station 102 and wireless communication device 106, may be relatively constant. In such wireless communication systems the transmitting power is, at least, determined by channel quality. In accordance with at least one example embodiment, since peak transmitting power may include a basic transmitting power level and, subsequently, one or more increased transmitting power levels based thereon, wireless communication device 106 may configured to control the basic transmitting power level to control the peak transmit power and to limit the increased transmit power levels.

Wireless communication device 106, according to one or more example embodiments, may change a modulation and coding scheme (MCS) level via adaptive modulation and coding (AMC). The MCS level may determine, according to the MCS table in 802.11n protocol, a modulation type (e.g., BPSK, QPSK, 16-QAM, or 64-QAM), a data rate, and a coding rate of a transmission on upstream link 216, and the MSC level may further may determine the basic transmitting power level.

To reduce PAPR, in accordance with at least one other example embodiment, wireless communication device 106 may be further configured to accommodate a channel quality indicator (Cal). For example, when receiver 210 of base station 102 is unable to receive or demodulate signals received via upstream link 216 from transmitter 212, the Cal may be updated to request transmitter 212 of wireless communication device 106 to increase the transmitting power level.

Thus, FIG. 2 shows an example configuration 200 of a transmission mode by which at least portions of controlling PAPR may be implemented.

Figure 3:
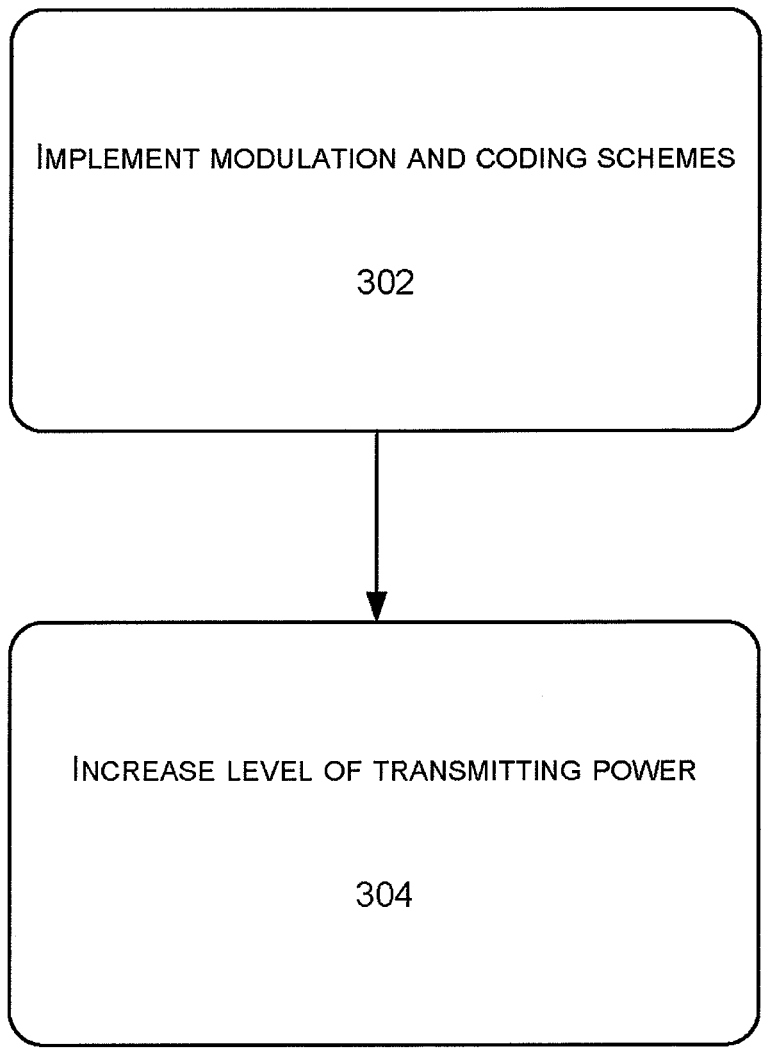
FIG. 3 shows an example configuration of a processing flow of operations for controlling PAPR, arranged in accordance with at least some embodiments described herein.

FIG. 3 shows an example configuration of a processing flow 300 of operations for controlling PAPR, arranged in accordance with at least some embodiments described herein. As depicted, processing flow 300 may include sub-processes executed by various components that are part of wireless communication system 100, which may also include configuration 200. However, processing flow 300 is not limited to such components, as obvious modification may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 302 and 304. Processing may begin at block 302.

CQI, as referenced in the present description, may refer to a measurement of the communication quality of wireless channels. A high value CQI may be indicative of a channel with high quality and vice versa. A CQI for a channel may be computed by making use of performance parameter, such as a signal-to-noise ratio (SNR), signal-to-interference plus noise ratio (SINR), and signal-to-noise plus distortion ratio (SNDR), which may be measured for a given channel and then used to compute a CQI for the channel. The CQI for a given channel may be dependent upon the transmission (modulation) scheme used by the communication system. For example, a wireless communication system using code-division multiple access (CDMA) may make use of a different CQI than a communication system that makes use of orthogonal frequency division multiplexing (OFDM).

MCS, as referenced in the present description, may refer to an index in a standardized table with transmission parameters corresponding to the index. The parameters may include, for example, a modulation type (e.g., BPSK, QPSK, 16-QAM, or 64-QAM), a data rate, and a coding rate of a transmission on upstream link 216. A higher MCS level causes a higher basic transmitting power level, a change in the CQI due to channel quality deterioration may contribute to increased transmitting power levels and further contribute to a higher peak transmitting power.

For example, comparing a first wireless communication device close to base station 102 at a lower MCS level with a second wireless communication device at edge 108 at a higher MCS level, the transmitting power of the second wireless communication device may supersede that of the first wireless communication device. Thus, in order to reduce peak transmitting power and to further control Peak-to-Average Power Ratio, any increase in the transmitting power while the channel quality deteriorates may be strictly controlled.

Block 302 (Implement Modulation and Coding Scheme) may refer to transmitter 212 dynamically implementing MCS and corresponding levels of the transmitting power based on changes in a condition of a wireless communication channel. The MCS may include one or more levels. Receiver 208/210 of wireless communication system 100 may first generate a CQI for transmitter 206/212 to determine the initial MCS level and further determine the basic transmitting power level accordingly. The basic transmitting power level may correspond to a certain channel quality (e.g., an ideal lossless channel) so that the basic transmitting power level may be maintained at a reasonable level. When the channel quality changes, the CQI may be updated and adaptive modulation and coding (AMC) may modify the MCS level accordingly. The MCS level may decrease when the condition of the wireless communication channel deteriorates and may increase when the condition improves. Processing may continue from block 302 to 304.

Block 304 (Increase Level of Transmitting Power) may refer to transmitter 212 increasing a level of the transmitting power incrementally by a predefined amount (e.g., 0.1 dB) in response to deterioration of the channel quality. When the channel quality deteriorates such that that no MCS level is suitable for the condition of the wireless communication channel as the condition deteriorates (i.e., AMC may not self-adaptively modify the MCS level), the receiving terminal (e.g., receiver 210) may update the CQI to indicate the deterioration. Transmitter 212 may then receive the updated CQI and increase the level of transmitting power by a defined amount. The total amount of increased transmitting power may be limited (e.g., 0.5 dB). The level of the transmitting power may be limited up to the maximum power lever regardless of receiving further information indicating deterioration of the condition of the wireless communication channel. For example, when wireless communication device 106 is at edge 108 of cell 104, MCS level may decrease in response to channel quality deterioration. Receiver 210 of base station 102 may update the CQI indicating the channel quality is deteriorating, and receiver 210 may be no longer capable of receiving signals from transmitter 212. The updated CQI may request the transmitting power to increase by an amount exceeding the limited total amount of increased transmitting power, e.g., 0.6 dB. Since the total amount of increased is limited to 0.5 dB, the peak transmitting power is limited to the basis transmitting power plus 0.5 dB, regardless of the request to increase transmitting power by 0.6 dB, and PAPR may be further limited.

Thus, FIG. 3 shows an example configuration of a processing flow 300 of operations for controlling Peak-to-Average Power Ratio (PAPR) may be implemented.

Figure 4:
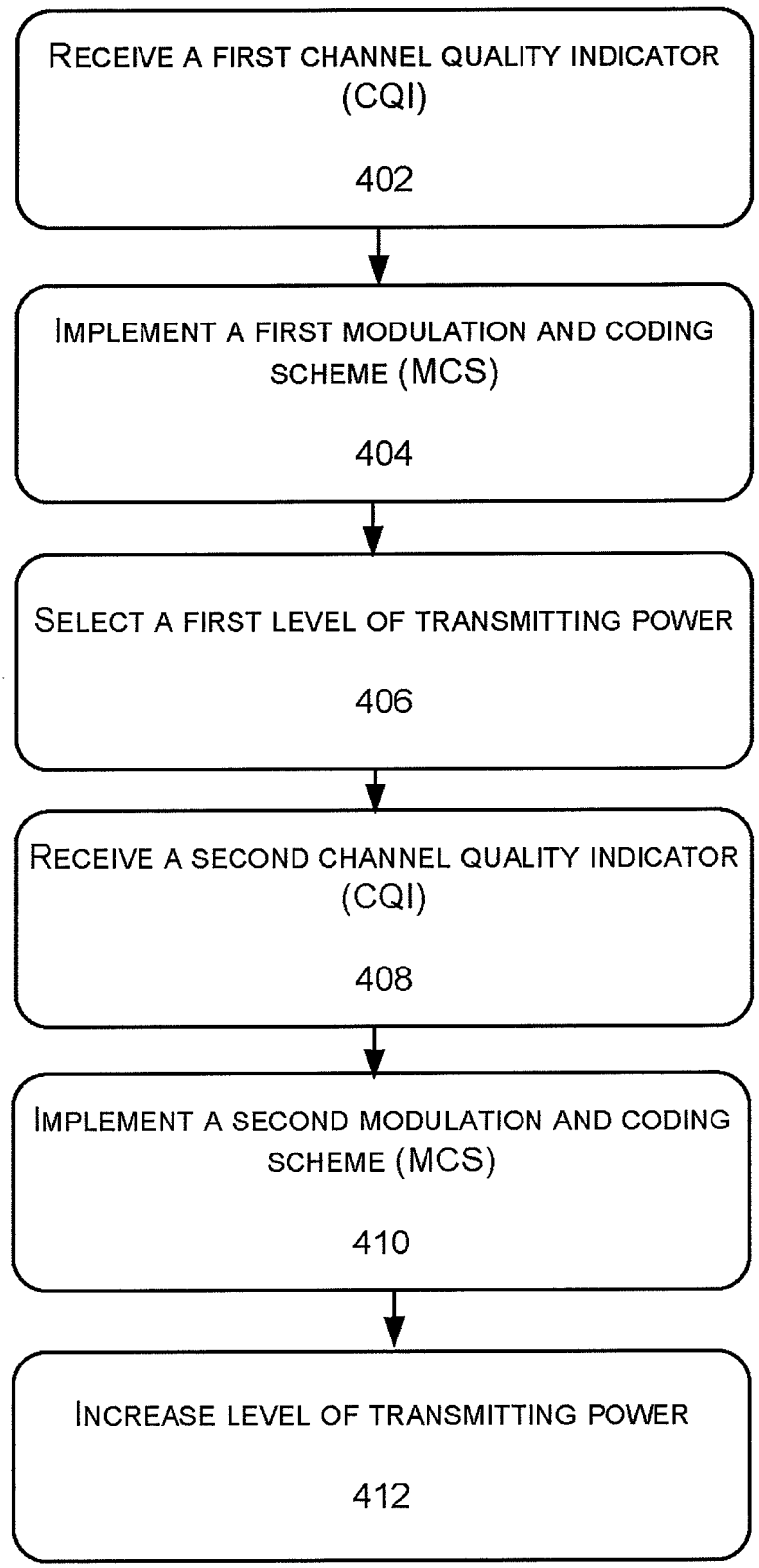
FIG. 4 shows another example configuration of a processing flow of operations for controlling PAPR, arranged in accordance with at least some embodiments described herein.

FIG. 4 shows another example configuration of a processing flow 400 of operations for controlling PAPR, arranged in accordance with at least some embodiments described herein. As depicted, processing flow 400 may include sub-processes executed by various components that are part of wireless communication system 100, which may also include configuration 200. However, processing flow 400 is not limited to such components, as obvious modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, 406, 408, 410, and 412. Processing may begin at block 402.

Block 402 (Receive a first channel quality indicator (CQI)) may refer to transmitter 212 receiving information representative of a first CQI regarding a condition of a wireless communication channel. In establishing upstream link 216 with receiver 210, transmitter 212 may initiate the communication by transmitting wireless signals. Receiver 210 may evaluate a condition of the wireless communication channel and determine the CQI based on the reception of the transmitted wireless signals. Processing may continue from block 402 to 404.

Block 404 (Implement a first modulation and coding scheme (MCS)) may refer to transmitter 212 implementing a first MCS corresponding to the first CQI. When transmitter 212 receives feedback information including the first CQI that indicates the quality of the wireless communication channel, transmitter 212 may accordingly choose a first MCS level to further determine one or more transmission parameters including modulation type, coding rate, and/or data rate. Processing may continue from block 404 to 406.

Block 406 (Select a first level of transmitting power) may refer to transmitter 212 selecting a first level of a transmitting power based on the first MCS. Since the transmission parameters are determined by the MCS level, a first level of transmitting power may be selected to satisfy the transmission parameters. Processing may continue from block 406 to 412.

Block 408 (Receive a second channel quality indicator (CQI)) may refer to transmitter 212 receiving information representative of a second CQI indicating deterioration of the condition of the wireless communication channel. In a wireless mobile communication system, the condition of the wireless communication channel may vary due to many factors including, at least, the location of the wireless communication device. For example, the condition of the wireless communication channel may deteriorate when wireless communication device 106 moves from a location close to base station 102 to another position close to edge 108. Receiver 210 may then update the CQI to indicate the deteriorating channel quality, and transmitter 212 may receive the second CQI. Processing may continue from block 408 to 410.

Block 410 (Implement a second modulation and coding scheme (MCS)) may refer to transmitter 212 implementing a second MCS corresponding to the second CQI in response to the second MCS being suitable for the second CQI. When transmitter 212 receives, from receiver 210, the feedback information including the second CQI that indicates the deteriorating quality of the wireless communication channel, transmitter 212 may accordingly choose a second MCS level to further determine one or more transmission parameters including modulation type, coding rate, and/or data rate. With regard to a deteriorating wireless communication channel, the second MCS level may be lower than the first MCS level. Processing may continue from block 410 to 412.

Block 412 (Increase level of transmitting power) may refer to transmitter 212 increasing a level of the transmitting power incrementally by a predefined amount in response to no MCS being suitable for the second CQI. When the condition of the wireless communication channel deteriorates such that that no MCS is suitable for the second CQI, transmitter 212 may increase the level of transmitting power by a predefined amount (e.g., 0.1 dB). When the channel quality continues to deteriorate, transmitter 212 may receive one or more additional CQIs indicating the further deterioration. Transmitter 212 may continue to increase the level of transmitting power accordingly. However, the level of transmitting power may be limited to a predefined maximum level (e.g., 0.5 dB) regardless of further information representative of other CQIs indicating further deterioration of the condition of the wireless communication channel.

In at least one example embodiment, the aforementioned processing flow 400 may be applied to transmitter 206 on base station 102. For example, transmitter 206 may transmit wireless signals carrying first data to one or more wireless communication devices at a selected first level of transmitting power. When the condition of wireless channel deteriorates, receiver 208 of wireless communication device 106 may submit, to receiver 208, a CQI indicating the deterioration. Transmitter 206 may then select a second MCS based on the CQI and further implement a second level of the transmitting power. A second level of transmitting power may be implemented accordingly. Transmitter 206 may transmit wireless signals carrying second data to the wireless communication devices at the second level of transmitting power. When the condition of wireless deteriorates to a certain level, receiver 208 may update the CQI. If no MCS is suitable for the CQI, the transmitter 206 may incrementally increase the transmitting power by a predefined level. The transmitting power may be limited to a maximum predefined level.

Thus, FIG. 4 shows another example configuration of a processing flow of operations for controlling Peak-to-Average Power Ratio (PAPR) may be implemented.

Figure 5:
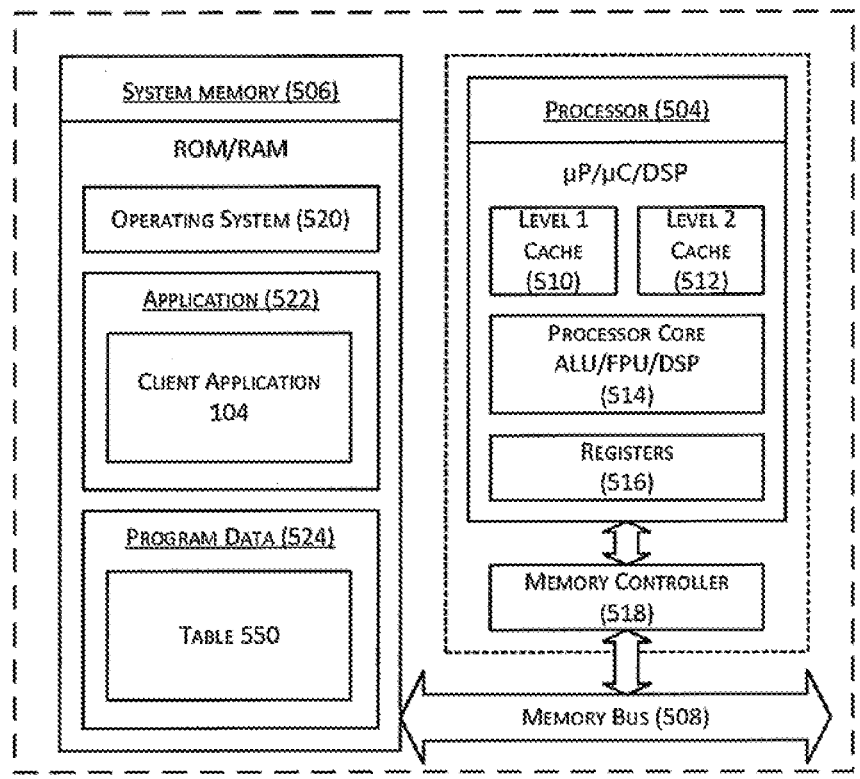
FIG. 5 shows a block diagram illustrating an example computing device by which various example solutions described herein may be implemented, arranged in accordance with at least some embodiments described herein.

FIG. 5 shows a block diagram illustrating an example computing device by which various example solutions described herein may be implemented, arranged in accordance with at least some embodiments described herein.

More particularly, FIG. 5 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the example wireless communication system.

In a very basic configuration, a computing device 500 may typically include one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524.

Application 522 may be configured to schedule to control Peak-to-Average Power Ratio (PAPR) as described previously with respect to FIGS. 1-4. Program data 524 may include a table 550, which may be useful for implementing actuation of appropriate components or modules as described herein.

System memory 506 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for wireless communication system 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method, comprising:
dynamically implementing modulation and coding schemes (MCS) and corresponding levels of a transmitting power, based on changes in a condition of a wireless communication channel, that are suitable for the condition of the wireless communication channel at a given time; and
increasing a level of the transmitting power of a transmitter incrementally by a predefined amount, up to a predefined limited maximum power level less than a maximum power level of the transmitter, when no MCS is suitable for the condition of the wireless communication channel as the condition deteriorates.

2. The method as recited in claim 1, wherein the increasing is in response to deterioration of the condition of the wireless communication channel.

3. The method as recited in claim 1, wherein the transmitting power does not exceed the predefined limited maximum power level, regardless of receiving further information indicating deterioration of the condition of the wireless communication channel.

4. The method as recited in claim 1, further comprising:
receiving information representative of channel quality indicators (CQIs) indicating the changes in the condition of the wireless communication channel.

5. The method as recited in claim 1, wherein the dynamically implementing comprises implementing a present MCS having a level of modulation and coding less than that of a previous MCS as the condition of the wireless communication channel deteriorates.

6. The method as recited in claim 1, wherein the dynamically implementing comprises implementing a present MCS having a level of modulation and coding greater than that of a previous MCS as the condition of the wireless communication channel improves.

7. The method as recited in claim 1, further comprising:
transmitting data to one or more wireless communication devices at the adopted levels of the transmitting power or the incrementally-increased level of the transmitting power.

8. The method as recited in claim 1, further comprising:
receiving information representative of a first CQI indicating improvement in the condition of the wireless communication channel;
implementing a first MCS corresponding to the first CQI;
selecting a first level of the transmitting power based on the first MCS;
transmitting first data to the one or more wireless communication devices in accordance with the first level of the transmitting power.

9. A method, comprising:
receiving information representative of a first channel quality indicator (CQI) regarding a condition of a wireless communication channel, the first CQI being dependent upon a transmission scheme of the wireless communication channel;
implementing a first modulation and coding scheme (MCS) corresponding to the first CQI;
selecting a first level of a transmitting power based on the first MCS;
receiving information representative of a second CQI indicating deterioration of the condition of the wireless communication channel;
implementing a second MCS corresponding to the second CQI in response to the second MCS being suitable for the second CQI; and
increasing a level of the transmitting power of a transmitter incrementally by a predefined amount, up to a predefined limited maximum power level less than a maximum power level of the transmitter, in response to no MCS being suitable for the second CQI.

10. The method as recited in claim 9, wherein a level of modulation and coding of the second MCS is less than a level of modulation and coding of the first MCS.

11. The method as recited in claim 9, wherein the increasing is in response to receiving further information representative of one or more additional CQIs indicating further deterioration of the condition of the wireless communication channel.

12. The method as recited in claim 9, wherein the transmitting power does not exceed the predefined limited maximum level regardless of receiving further information representative of one or more additional CQIs indicating further deterioration of the condition of the wireless communication channel.

13. The method as recited in claim 9, further comprising:
transmitting first data to one or more wireless communication devices at the first level of the transmitting power after selecting the first level of the transmitting power;
implementing a second level of the transmitting power based on the second MCS;
transmitting second data to the one or more wireless communication devices in accordance with the second level of the transmitting power when the second MCS is suitable for the second CQI; and
transmitting the second data to the one or more wireless communication devices in accordance with the incrementally-increased level of the transmitting power when no MCS is suitable for the second CQI.

14. The method as recited in claim 9, further comprising:
receiving information representative of a third CQI indicating improvement of the condition of the wireless communication channel;
implementing a third MCS corresponding to the third CQI;
selecting a third level of the transmitting power based on the third MCS; and
transmitting third data to the one or more wireless communication devices in accordance with the third level of the transmitting power.

15. A non-transitory computer-readable medium storing instructions that, when executed, cause one or more processors to perform operations comprising:
receiving information representative of a condition of a wireless communication channel;
implementing a modulation and coding scheme (MCS) and correspondingly a level of a transmitting power when the adopted MCS is suitable for the condition of the wireless communication channel; and
increasing a level of the transmitting power of a transmitter incrementally by a predefined amount, up to a predefined limited maximum power level less than a maximum power level of the transmitter when no MCS is suitable for the condition of the wireless communication channel as the condition deteriorate.

16. The non-transitory computer-readable medium as recited in claim 15, wherein a level of modulation and coding of the second MCS is less than a level of modulation and coding of the first MCS.

17. The non-transitory computer-readable medium as recited in claim 15, wherein the increasing is in response to receiving further information representative of one or more additional CQIs indicating further deterioration of the condition of the wireless communication channel.

18. The non-transitory computer-readable medium as recited in claim 15, the transmitting power does not exceed the predefined limited maximum level, regardless of receiving further information representative of one or more additional CQIs indicating further deterioration of the condition of the wireless communication channel.

19. The non-transitory computer-readable medium as recited in claim 15, the operations further comprising:
    transmitting first data to one or more wireless communication devices in accordance with the first level of the transmitting power;
    selecting a second level of the transmitting power based on the second MCS;
    transmitting second data to the one or more wireless communication devices in accordance with the second level of the transmitting power in response to the second MCS being suitable for the second CQI; and
    transmitting the second data to the one or more wireless communication devices in accordance with the incrementally-increased level of the transmitting power when no MCS is suitable for the second CQI.

20. The non-transitory computer-readable medium as recited in claim 15, the operations further comprising:
    receiving information representative of a third CQI indicating improvement of the condition of the wireless communication channel;
    implementing a third MCS corresponding to the third CQI;
    selecting a third level of the transmitting power based on the third MCS; and
    transmitting third data to the one or more wireless communication devices in accordance with the third level of the transmitting power.

* * * * *